May 9, 1961     G. A. FINLEY ET AL     2,983,500

DRYING APPARATUS

Filed June 22, 1959     2 Sheets-Sheet 1

INVENTORS
GEORGE A. FINLEY
GEORGE W. SPIELER
BY Frank J. Foley
ATTORNEY

United States Patent Office 2,983,500
Patented May 9, 1961

2,983,500
DRYING APPARATUS
George A. Finley and George W. Spieler, Aurora, Ill., assignors to Finco, Inc., Aurora, Ill., a corporation of Illinois
Filed June 22, 1959, Ser. No. 822,082
8 Claims. (Cl. 263—19)

This invention relates to improvements in apparatus for the drying of cereal grains and other bulk material presenting similar drying problems.

In accordance with ancient custom, the small grains such as corn, rye, wheat, oats, soybeans, and other crops such as hay and peanuts, have generally been allowed to dry naturally in the field to a low enough moisture content that they may be safely stored without additional drying after being harvested. A number of newly arisen considerations, however, not necessary to delineate here, but primarily related to economical use of labor, equipment, time and acreage, recommend a break with custom in certain circumstances to permit the harvesting of some of these and other crops while they still have a high moisture content. The present invention provides apparatus which makes practicable and convenient the economical drying of grains and other crops which have been harvested while at a relatively high moisture content. In the interest of brevity, the discussion which follows may contain specific reference only to a grain such as corn, although other crops and, indeed, other materials, may likewise be dried and treated advantageously in accordance with this invention.

As will readily be understood by those familiar with the harvesting and marketing of grains, any artificial grain drying procedure must be conducted with exceptional economy and care in order to be economically justified, in view of the competition of crops not dried artificially.

In accordance with the present invention, corn may be harvested in the field by means of conventional equipment which picks and shells the corn simultaneously, delivering the moist shelled corn into a conventional wagon having a perforated false bottom. The wagon, when loaded, is hauled to and connected to the drying apparatus, to which other similar wagons may also be connected at the time. Thereafter, heated air will be circulated through the load until the corn is sufficiently dehydrated. Without moving the wagon, and without interrupting the drying or cooling of other connected wagons, the dried corn will then be rapidly cooled to about atmospheric temperature, after which the wagon may then be disconnected and hauled away for storage of its contents or other use. Thus, with a minimum of handling and manipulation, corn having a moisture content even as high as 35 to 50% moisture, or higher, may be harvested, dried, cooled and stored within a matter of a few hours economically. By utilizing conventional wagons with perforated false bottoms to receive the corn as it is husked and shelled, and by using those same wagons and the same drier for the drying and cooling operations, the handling costs may be held to a minimum.

The general object of this invention is to provide an apparatus adapted for performing the functions of drying and of cooling small cereal grains and other bulk material.

Another object of the invention is to provide apparatus to which a plurality of containers for loads of cereal grains may be simultaneously connected, the apparatus being adapted for drying or cooling all the containers simultaneously, or to cool some of the dried loads while other fresh loads are being dried.

Another object, conducive to overall economy, is to provide drying apparatus capable of using already known perforated wagon bodies in a cycle of operations which can be timed to coordinate with conventional and practical picking, shelling and storing operations.

Another object of the invention is to provide automatic controls which may be used if desired to shut off the drying operation in any wagon box when the contents thereof are adequately dried, by a control mechanism subject to a condition of the air rising from the wagon contents, such as temperature or humidity.

Another object of the invention is to provide various safety control features which will facilitate the safe and economical operation of the apparatus.

Other objects and further advantages of the invention will be mentioned hereinafter and will become apparent from a perusal of this specification.

In the drawings, a preferred embodiment and a modification of the invention have been selected to illustrate how it may be constructed and operated.

Figure 1:
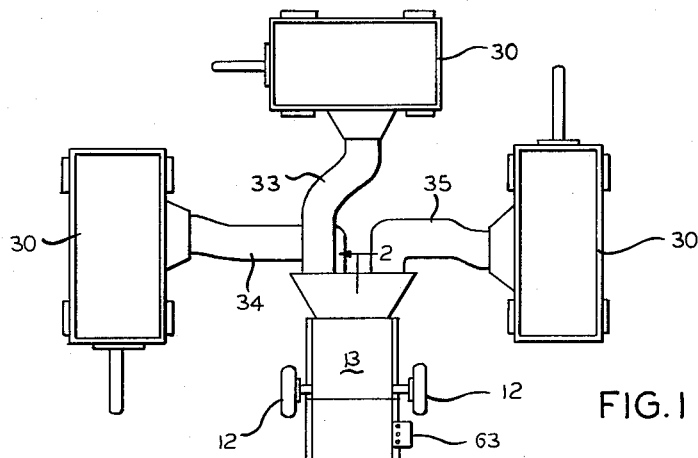
Figure 1 is a top plan view, on a very reduced scale, of the drying apparatus showing it connected to three wagons.

Referring further to the drawings, in a preferred embodiment of the invention an undercarriage 11, having suitable wheels 12 to facilitate towing of the drying apparatus, supports a generally cylindrical chamber 13. At the inlet end of the chamber is mounted a screen 14 and a fan 15 which is rotated by a belt pulley 16. While any suitable source of power may be used for driving this fan, it is convenient to drive it from the power take-off shaft of a tractor. The details of construction of such a driving mechanism are conventional and do not form a part of the invention, although it may be added that the same driving mechanism may be employed to drive an A.-C. generator to furnish current for the ignition and for the electrical controls hereinafter described.

Figures 2, 3:
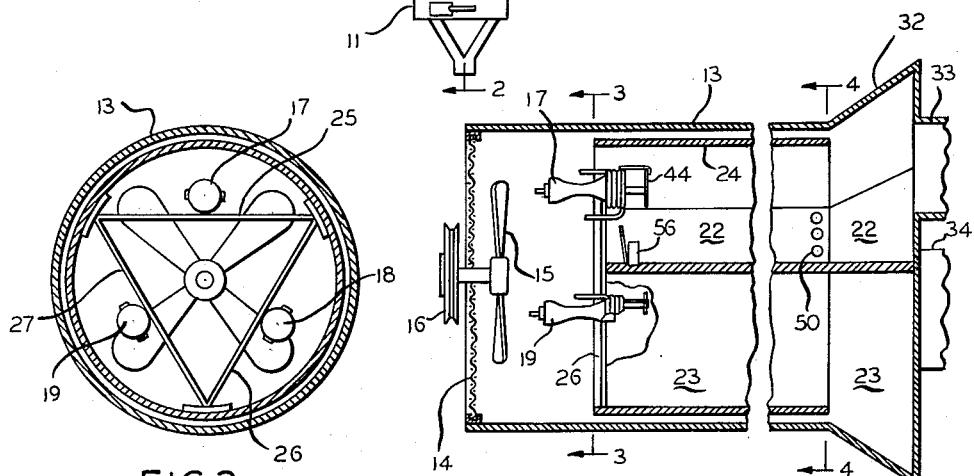
Figure 2 is a vertical longitudinal sectional view of the drying apparatus itself, approximately at the position of lines 2—2 of Figures 1 and 4.
Figure 3 is a sectional view on the line 3—3 of Figure 2.

The fan 15 blows air past the burners, which in this embodiment are internally mounted and are illustrated as 17, 18 and 19. The chamber 13 beyond the fan section is divided into three longitudinally extending mixing chambers by means of the partitions 21, 22 and 23, which extend radially from the longitudinal axis of the drier to an inner cylindrical shell 24 spaced somewhat inwardly from the outside wall of the cylinder 13. As shown in Figures 2 and 3, a burner extends into each mixing compartment.

The burners may be mounted on a burner support frame having the frame members 25, 26 and 27, which may be suitably secured as by welding to arcuate shoes welded to the inner shell 24. The inner shell 24 serves the purpose of protecting the outer wall cylinder 13 from high temperatures in the vicinity of the burners which might scorch a protective coating of paint applied to the device. Air from the fan, as will be obvious, will flow between the shell 24 and the cylinder wall 13 to keep the latter cool.

The longitudinal partitions 21, 22 and 23 thus divide the main portion of the drier chamber, with the exception of the fan section, into three compartments each of which also contains a burner, thus constituting each compartment as a mixing compartment for the products of combustion of their associated burners and the air supplied by the fan 15. These compartments are designated as 28, 29 and 31. The discharge end of the drier has an enlarged expandingly tapered end section 32 to which may be connected in any suitable manner flexible ducts for carrying the mixed air and products of combustion to the wagon boxes 30. Duct 33 is connected to mixing compartment 28, duct 34 is connected to mixing compartment 29, and duct 35 is connected to mixing compartment 31.

The wagon boxes themselves do not constitute a part of this invention. A portion of one of them is shown in section in Figure 5, having an imperforate bottom 36 and spaced upwardly therefrom a perforated false bottom 37, providing therebelow a chamber into which the hot mixed air may be introduced for passage upwardly through the body of grain disposed in the box, the upper limit of the load being designated by the line 38.

Figure 5:
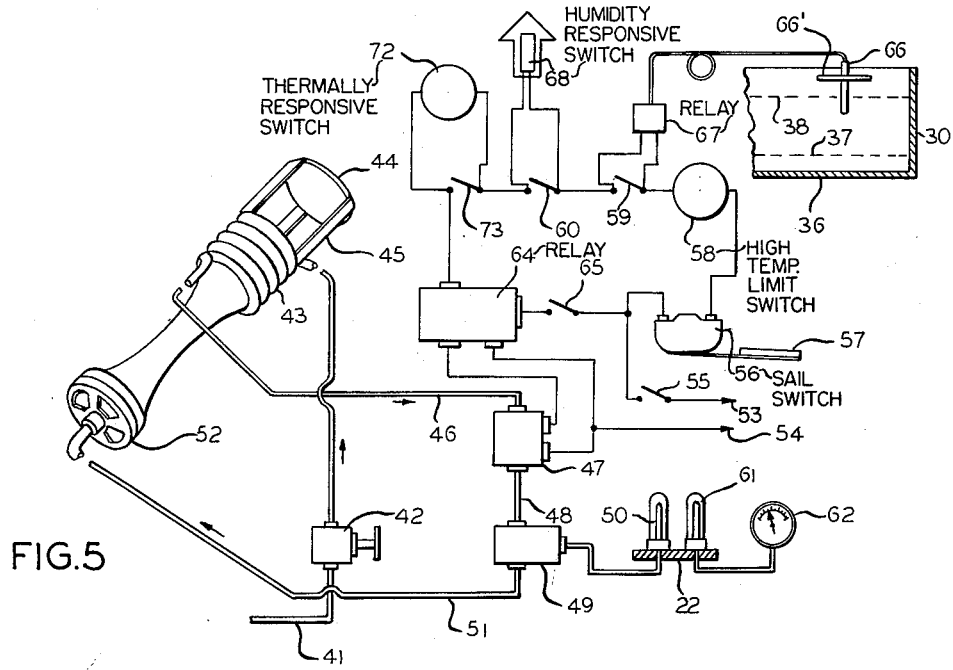
Figure 5 is a diagrammatic view showing one burner and certain controls associated therewith.

While various fuels may be utilized, a convenient one is liquified propane, to be burned as a gas. Figure 5, illustrates diagrammatically one complete fuel control installation for one mixing compartment. A pipe 41 supplies the liquid fuel through a manually controlled on-off valve 42 to a spiral pre-heater coil 43 positioned loosely about the outlet end of the gas burner, which may appropriately be a conventional venturi tube type of burner. Some of the coils will preferably extend beyond the open end of the burner where they may be exposed to the products of combustion, which are additionally reflected back upon them by a baffle 44 supported by arms such as 45 attached to the end convolutions of the coil. By means not shown herein, but disclosed in our co-pending application Ser. No. 814,504, filed May 20, 1959, this coil may be shifted on its support longitudinally of the burner to expose more or less of the coil convolutions, to increase or decrease the rate of pre-heating of the fluid fuel passing therethrough.

A return pipe 46 brings the pre-heated fuel back to a solenoid operated on-off valve 47, which is normally wide open during burner operation, thence through pipe 48 to a conventional modulating adjustable pressure reducing valve 49 which the operator may adjust manually and which preferably is also automatically adjusted or controlled by a thermostatic element 50 mounted in the mixing compartment to regulate the fuel flow and hence the temperature of the mixed air and products of combustion being delivered into the associated flexible outlet duct.

The pipe 51 leading from the modulating valve 49 delivers this pre-heated fuel to the burner, which has an adjustable air inlet control plate 52 of conventional character and a conventional orifice plug (not shown) through which the fuel is projected into the throat of the venturi tube where it mixes with the necessary air for efficient combustion.

A spark plug (not shown) extends into the burner tube for igniting the flame at the outset of a heating period. For operating this spark plug a conventional spark coil and ignition button will be provided, but these details are not shown as they are conventional apparatus for that purpose.

For controlling the safe and efficient operation of the drier the following circuits are provided. A pair of wires 53 and 54 furnish current from the A.-C. source through a stepdown transformer (not shown) and voltage is applied through the starting switch 55 on the live side of the circuit to a conventional "sail" switch 56, shown in Figure 2. This switch is open when the fan 15 is not operating. The air stream from the operating fan striking the pivoted blade 57 will cause this switch to close, thus supplying voltage to a high temperature limit switch 58, one of these switches being positioned approximately as shown in each mixing compartment. This type of switch is conventional and readily obtainable, and is adapted normally to close a circuit through it unless the temperature to which it is exposed should rise above some arbitrarily selected predetermined maximum temperature. Usually this type of switch is capable of some adjustment within a selected range and in the operation of our apparatus this switch would automatically open whenever the heated air being discharged into the associated flexible duct reaches such a high temperature that it would be dangerous to the duct or the wagon contents to maintain that temperature. The opening of switch 58 will shut off the associated burner, as will be explained later.

When a load of grain or other material is being dried in the wagon box associated with the control apparatus shown in Figure 5, the operator may, if he desires, employ either of two automatic controls (later described) for terminating the drying period in that box, or he may, if desired, by-pass the automatic controls. In such latter event, he would maintain the switches 59 and 60 closed.

In the operation of the apparatus when not using automatic controls for terminating the drying cycle, after a loaded wagon is properly connected to the mixing compartment, the fan would be started, which would cause the sail switch to close. The valve 42 would then be opened, supplying fuel to the burner, ignition would be started with the aid of the ignition button, and the pressure regulating valve 49 would be manipulated by the operator, if necessary, to adjust the temperature of the heated air stream to whatever temperature he desired. In order to show what this temperature is, a conventional temperature responsive element such as 61 (Fig. 4) mounted near the outlet end of the mixing compartment controls a temperature indicating gauge 62 in a conventional manner (not shown), which would be mounted conveniently on the control box 63 shown in Figure 1 secured to the side of the drying apparatus. This control box or panel may carry all of the valves and switches necessary for the operation of the apparatus. Thus the temperature of the air entering the wagon box would be initially adjusted under the conditions then prevailing. When this invention is in ordinary use the ambient atmospheric temperature of course is quite variable, in the harvest seasons being usually rather cool in the morning and changing for various reasons during the daytime. The thermostatic element 50 acting on the modulating valve 49 can be relied upon to maintain a desired temperature in the heated air delivered through each duct.

The voltage supplied through switches 55, 56, 58, 59 and 60 will hold a relay 64 energized, which supplies voltage to the solenoid operated valve 47, holding that valve open. Should the temperature emerging from the mixing compartment exceed a predetermined safe high limit, the switch 58 will open, releasing relay 64 and allowing valve 47 to close, thus immediately shutting off the supply of fuel to the associated burner. When the condition causing this excess temperature has been corrected and the high limit switch 58 has cooled down enough to close, a re-set switch 65 may be closed temporarily to energize relay 64, permitting the burner to resume operation upon re-ignition.

It should be apparent that if the fan should cease operating for any reason, such as a power or belt failure, the sail switch 56 can be relied upon to open, thus deenergizing relay 64 and shutting off the associated burner.

While the drying period for any load may be terminated manually, if desired, by opening the switch 55, this invention provides for the automatic termination when a load is dried to a desired degree, as will now be explained.

When a load of material is being dehydrated in one of the wagon boxes, the temperature of the air emerging from the top of the layer will be very much lowered by the heat given up from it during the evaporation of moisture, but when the contents of the wagon are approaching a desired state of dryness, such as 10% to 15% moisture content, for example, and the rate of evaporation is much diminished, the air emerging from the wagon box will not have been cooled so much, hence the thermostatic element 66 supported in any suitable manner and shown in Figure 5 may be used pneumatically or electrically to open a relay 67 of conventional character through which current up to that time would have been flowing, if the by-pass switch 59 were open. A suitable deflecting baffle 66' assures more repreesntative flow of air in contact with element 66. Thus the temperature of the air emerging from the load material may be used to automatically shut off the burner associated with that load, whereupon cooling begins at once.

Figure 6:
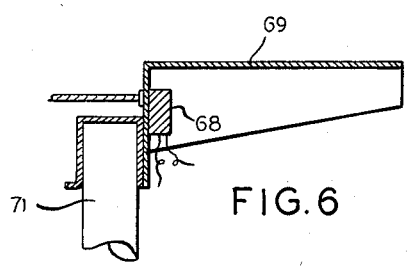
Figure 6 is a view partly in section showing the positioning of a humidity responsive control device mounted on a wagon box.
Figure 7:
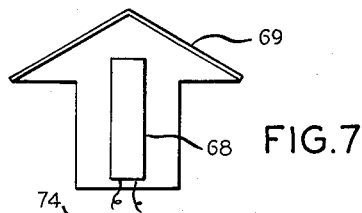
Figure 7 is a front elevation of the same control device.

The drying period for each load may alternatively be terminated in response to a predetermined humidity achieved in the air arising from a grain load. For this purpose a device and the necessary connections therefor are shown in Figures 5, 6 and 7. They include a humidity responsive electrical device including a switch, manufactured by Minneapolis-Honeywell Regulator Co., identified commercially as H64A–SPDT. This humidity responsive device 68 should be mounted just slightly above the grain load in the wagon being subjected to the drying operation, and is preferably mounted under a deflecting hood 69 and may be supported, if desired, by clamping it to an edge wall 71 of the wagon box, as shown in Figure 6. Lead wires from this device lead, as shown, to the opposite sides of the by-pass switch 60, which will be open during the drying operation.

During the early part of the drying period the vapor arising from the wagon load will subject this controller to a very high relative humidity, actually a visible fog, in many instances, and under this condition the switch in the controller remains closed, therefore holding the relay 64 energized and thus continuing the operation of the burner. But when the load approaches the ultimately desired low moisture content, the relative humidity of the air stream flowing past this controller will eventually be reduced to such a selected, predetermined degree as will cause the switch in the controller to open, de-energizing relay 64 and the solenoid operated valve 47, shutting off the associated burner. Cooling of the load by unheated air from the fan immediately begins. This controller is adapted to be adjusted to cause the switch to open at any selected relative humidity, hence the operator may rely on the device to terminate the drying period when the load is dried to a desired extent.

When either of the above described automatic controls is used, it may be necessary at the outset of the drying operation to close the by-pass switch associated therewith, if the condition of the air at the outset is such that the humidity control switch would then be open or the temperature responsive control relay would then be open. In such case the associated by-pass switch would remain closed only until the vapor arising from the load would naturally cause the circuit under the control of the control device to close.

In place of using a humidity responsive control device or a temperature responsive device to automatically terminate the drying period, as explained above, we may use a humidity indicator which can be read by the operator, who will at the proper time manually shut off the drying operation in the associated box when a desired low degree of humidity is indicated. Alternatively, a simple indicating thermometer may be installed to encounter the moist air arising from the wagon load, which will indicate to the operator by a rise to a selected temperature when to open the switch 65.

Whichever way the drying of any particular load may be terminated, there will ensue automatically, without any further manipulation or delay, a cooling cycle for that load as the fan continues to blow air, which remains unheated, directly through the mixing compartment and duct into that wagon load. This will occur whether or not other wagon loads are being dried or are being cooled, if connected at all. Quick cooling immediately after the drying period is important to save the load from possible harm due to prolonged heating, and also to condition the dried load more rapidly for disconnection from the apparatus and removal for storage or other use. We customarily use a large fan and adequate power to drive a large volume of air, whether heated or not, at high velocity into each duct for distribution into each wagon load.

As a safety precaution in the event of a flame blowout, a conventional thermally responsive switch 72 similar to the thermal responsive switch 58 is positioned in each mixing compartment and adjusted to open the circuit, which otherwise is normally closed through it, whenever the temperature of the air stream flowing past it falls to such a low temperature as would result from extinguishment of the burner, e.g., a few degrees above the highest expected atmospheric temperature, such as 110° F. Should the flame blow out and the temperature drop to the set lower limit of switch 72, relay 64 will be de-energized, allowing the solenoid operated valve 47 to close. When the drier is being started, it is necessary to close the by-pass switch 73 until the temperature attained in the mixing compartment is high enough to close switch 72.

Figure 4:
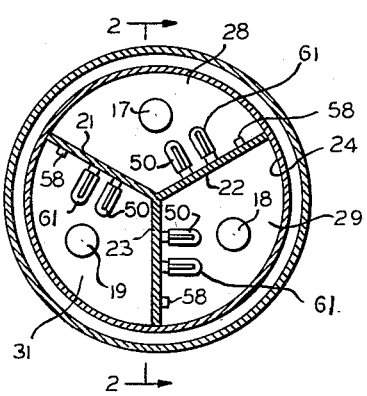
Figure 4 is a sectional view on the line 4—4 of Figure 2.
Figure 8:
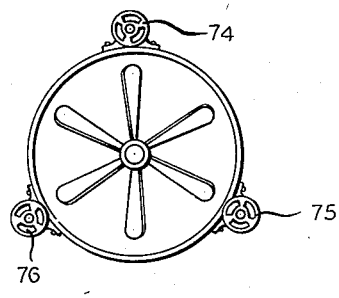
Figure 8 is an end elevation of a modified form of the drier showing the burners mounted on the outside wall thereof.
Figure 9:
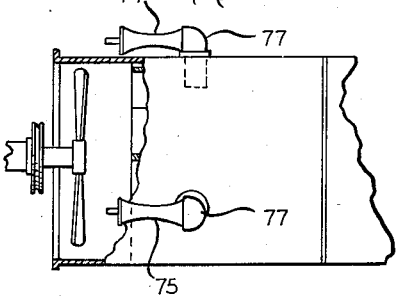
Figure 9 is a side elevation partly in section of a portion of the same drier.

A slightly modified form of our drying apparatus is shown in Figures 8 and 9. The modification is limited to positioning the burners for the individual compartments on the outside of the drier, rather than on the inside, as was shown in Figure 2. In this form of the invention the drier is divided by longitudinally extending partitions to form three separate mixing compartments, just as indicated in Figure 4, but the burners 74, 75 and 76 are supported in any suitable manner on the outside shell of the drier, and each is equipped with an elbow such as 77 extending into the mixing compartment with which that burner is associated. There are some advantages, such as more ready access to the burners, in mounting them on the outside of the drier shell. In all other respects this form of the invention operates in the same manner as does the drier described in connection with Figures 1–7, inclusive.

In addition to the drying of cereal grains, this invention may be used for the drying of chopped green hay or other green products of the fields. The use of this apparatus is not limited to agricultural products.

While provision for simultaneous treatment of three loads by one apparatus is shown herein, the device may be designed for connection to a greater or lesser number of loads.

This application is a continuation-in-part of our application Serial No. 638,956, filed February 8, 1957, now abandoned.

While preferred embodiments of the invention have been shown and described herein, it should be understood that the invention is susceptible of considerable variation without departing from the scope of the invention defined in the appended claims.

Having shown and described the invention, we claim:

1. Material drying apparatus for simultaneous connection with a plurality of bulk material drying boxes comprising a horizontally extending tubular structure having horizontally extending baffles therein dividing it into a plurality of separate mixing compartments, a fan compartment at one end of said structure having its outlet communicating with each of said mixing compartments and its inlet communicating directly with the atmosphere, a fan in said fan compartment, each mixing compartment having an outlet port remote from its inlet adapted for individual connection with one of said boxes, a fluid fuel burner in each mixing compartment adjoining its inlet end, means for thermostatically controlling each individual burner responsive to the temperature of the air flowing through its associated mixing compartment outlet, and means responsive to the temperature of the air emerging from the material in any box for selectively shutting off the burner supplying heat to such box whereby thereafter said fan may deliver unheated air through the mixing compartment whose burner is shut off.

2. Drying apparatus for connection with a plurality of bulk material drying boxes comprising a horizontally extending tubular chamber having horizontally extending baffles therein dividing it into a plurality of separate mixing compartments, a fan compartment at one end of said chamber having a fan therein and having its discharge outlet communicating with one end of each of said mixing compartments and its inlet communicating directly with the atmosphere, each mixing compartment having a separate outlet port remote from its inlet adapted for individual connection each with one of said boxes, means including ducts for forming said connections, a fluid fuel burner in each mixing compartment adjoining its inlet end, and means for regulating each burner including means for selectively shutting off the burner in any single compartment while other burners continue to operate whereby the fan is enabled thereafter to blow unheated air through such compartment into the associated connected box for cooling its contents.

3. Drying apparatus for connection with a plurality of bulk material drying boxes comprising an elongated tubular chamber having longitudinally extending partitions therein dividing it into a plurality of separate mixing compartments, a fan compartment at one end of said chamber having a fan therein and having its discharge outlet communicating with the inlet end of each compartment and having its inlet communicating directly with the atmosphere, each mixing compartment having an outlet port remote from its inlet end adapted for individual connection each with one of said boxes, means including ducts for forming said connections, a fluid fuel burner in each mixing compartment adjoining its inlet end adapted for discharging products of combustion into the air propelled through such compartment by the fan, and means for regulating each burner including means for selectively shutting off the burner in any selected mixing compartment while other burners continue to operate whereby the fan is enabled thereafter to blow unheated air through such compartment into the associated connected box for cooling its contents.

4. Drying apparatus for connection with a plurality of bulk material drying boxes comprising a tubular chamber having baffles extending therein in the direction of air flow therethrough dividing the chamber lengthwise into a plurality of separate mixing compartments, a fan compartment at one end of the chamber having a fan therein and having its discharge outlet in registration with an open end of each of said mixing compartments and its inlet communicating directly with the atmosphere, each mixing compartment having a separate outlet port opening to the exterior of the chamber and remote from its air inlet end adapted for individual connection exteriorly of the chamber each with one of said boxes, means including ducts for forming said exterior individual connections, a fluid fuel burner for each mixing compartment supported on said chamber and having a discharge outlet positioned and adapted to discharge its products of combustion into the moving air within its associated compartment for admixture with said air therein, and means for regulating each burner including means for selectively shutting off each single burner without shutting off the other burners which may be continued in operation whereby the fan thereafter blows unheated air into and through the outlet of the associated compartment whose burner has been shut off into an associated connected box for cooling its contents, while the fan and the operating burners continue to supply heated air through other compartments to the boxes connected therewith.

5. Drying apparatus for connection with a plurality of bulk material drying boxes comprising a tubular chamber having baffles extending therein in the direction of air flow therethrough dividing the chamber lengthwise into a plurality of separate mixing compartments, a fan compartment at one end of the chamber having a fan therein and having its discharge outlet in registration with an open end of each of said mixing compartments and its inlet communicating directly with the atmosphere, each mixing compartment having a separate outlet port opening to the exterior of the chamber and remote from its air inlet end adapted for individual connection exteriorly of the chamber each with one of said boxes, means including ducts for forming said exterior individual connections, a fluid fuel burner for each mixing compartment supported on said chamber and having a discharge outlet positioned and adapted to discharge its products of combustion directly into the fan driven air within its associated compartment for admixture with said air therein, means for thermostatically controlling each individual burner responsive to the temperature of the air flowing through its associated mixing compartment outlet, and means responsive to the temperature of the air emerging from the material in any box for selectively shutting off the burner supplying heat to such box whereby thereafter said fan may deliver unheated air through the mixing compartment whose burner is shut off.

6. Drying apparatus for connection with a plurality of bulk material drying boxes comprising a tubular chamber having baffles extending therein in the direction of air flow therethrough dividing the chamber lengthwise into a plurality of separate mixing compartments, a fan compartment at one end of the chamber having a fan therein and having its discharge outlet in registration with an open end of each of said mixing compartments and its inlet communicating directly with the atmosphere, each mixing compartment having a separate outlet port opening to the exterior of the chamber and remote from its air inlet end adapted for individual connection exteriorly of the chamber each with one of said boxes, means including ducts for forming said exterior individual connections, a fluid fuel burner for each mixing compartment supported on said chamber and having a discharge outlet positioned and adapted to discharge its products of combustion into the moving air within its associated compartment for admixture with said air therein, means for thermostatically controlling each individual burner responsive to the temperature of the air flowing through its associated mixing compartment outlet, and means responsive to the humidity of the air emerging from the material in any box for selectively shutting off the burner supplying heat to such box whereby thereafter said fan may deliver unheated air through the mixing compartment whose burner is shut off.

7. Drying apparatus for connection with a plurality of bulk material drying boxes comprising a tubular chamber having baffles extending therein in the direction of air flow therethrough dividing the chamber lengthwise into a plurality of separate mixing compartments, a fan compartment at one end of the chamber having a fan therein and having its discharge outlet in registration with an open end of each of said mixing compartments and its inlet communicating directly with the atmosphere, each mixing compartment having a separate outlet port opening to the exterior of the chamber and remote from its air inlet end adapted for individual connection exteriorly of the chamber each with one of said boxes, means including ducts for forming said exterior individual connections, a fluid fuel burner for each mixing compartment supported on said chamber and having a discharge outlet positioned and adapted to discharge its products of combustion directly into the fan driven air within its associated compartment for admixture with said air therein, and means responsive to the temperature of the air emerging from the material in any box for selectively shutting off the burner supplying heat to such box whereby thereafter said fan may deliver unheated air through the mixing compartment whose burner is shut off.

8. Drying apparatus for connection with a plurality of bulk material drying boxes comprising a tubular chamber having a concentric tube spaced inwardly from the outer wall of said chamber, baffles positioned in said tube extending in the direction of air flow therethrough and extending beyond the tube to the outlet end of the chamber dividing the tube lengthwise and the chamber into a plurality of separate mixing compartments, a fan compartment at one end of the chamber having a fan therein and having its discharge outlet in registration with an open end of each of the mixing compartments and with the space between said tube and said outer wall, the fan compartment having an inlet communicating directly with the atmosphere, each mixing compartment having a separate outlet port at the outlet end of the chamber opening to the exterior of the chamber and remote from its air inlet adapted for individual connection exteriorly of the chamber each with one of said boxes, means including ducts for forming said exterior individual connections, a fluid fuel burner for each mixing compartment positioned to discharge its combustion products directly into the fan driven air within its associated compartment, and means for regulating each burner individually including means for selectively shutting off the burner in any single compartment while other burners continue to operate whereby the fan is enabled thereafter to blow unheated air through such compartment into the associated connected box for cooling its contents.

References Cited in the file of this patent

UNITED STATES PATENTS

| | | |
|---|---|---|
| 1,717,115 | McCann | June 11, 1929 |
| 2,592,899 | Hopkins | Apr. 15, 1952 |
| 2,661,544 | Tanasse | Dec. 8, 1953 |
| 2,853,284 | Freeman | Sept. 23, 1958 |

FOREIGN PATENTS

| | | |
|---|---|---|
| 524,621 | Great Britain | Aug. 12, 1940 |